United States Patent
Qian et al.

(10) Patent No.: US 12,413,166 B2
(45) Date of Patent: Sep. 9, 2025

(54) METHOD FOR CONTROLLING DIRECT DRIVE TRANSMISSION SYSTEM AND RELATED DEVICE

(71) Applicant: AAC Microtech (Changzhou) Co., Ltd., Changzhou (CN)

(72) Inventors: Lin Qian, Shenzhen (CN); Shun Guo, Shenzhen (CN); Xueyuan Zhu, Shenzhen (CN); Min Chen, Shenzhen (CN); Weiling Shi, Shenzhen (CN); Yu Qin, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/915,505

(22) PCT Filed: Sep. 9, 2022

(86) PCT No.: PCT/CN2022/118180
§ 371 (c)(1),
(2) Date: Sep. 29, 2022

(87) PCT Pub. No.: WO2024/000820
PCT Pub. Date: Jan. 4, 2024

(65) Prior Publication Data
US 2025/0125756 A1  Apr. 17, 2025

(30) Foreign Application Priority Data
Jun. 30, 2022 (CN) .......................... 202210772227.2

(51) Int. Cl.
H02P 25/06 (2016.01)
G05D 3/12 (2006.01)
H02P 1/02 (2006.01)

(52) U.S. Cl.
CPC ............. *H02P 25/06* (2013.01); *G05D 3/125* (2013.01); *H02P 1/029* (2013.01)

(58) Field of Classification Search
CPC .......... G05D 3/125; H02P 25/06; H02P 1/029
See application file for complete search history.

(56) References Cited

U.S. PATENT DOCUMENTS 10,914,620 B2 * 2/2021 Huang ................ G01D 18/006
10,926,418 B2 * 2/2021 Lu ............................ H02K 7/06
(Continued)

*Primary Examiner* — Thai T Dinh
(74) *Attorney, Agent, or Firm* — Wiersch Law Group

(57) ABSTRACT

A method for controlling a direct drive transmission system and related devices. The method includes: S1: starting direct drive transmission system for overall zero returning; S2: reading a zero signal of the first incremental position feedback means identified by a corresponding second incremental position feedback means; S3: determining whether any actuator reads two zero signals; if yes, performing step S4; otherwise, returning to step S1; S4: determining according to a distance between two zero signals fed back by the actuator that the corresponding mover has completed zero returning, and further completing zero returning of the direct drive transmission system; and S5: acquiring, by the controller based on the direct drive transmission system after zero returning, position information of the movers, and driving the movers to move. Compared with the related art, the present disclosure has good position feedback effect, high positioning accuracy, and good drive control effect.

7 Claims, 8 Drawing Sheets

(56) References Cited

U.S. PATENT DOCUMENTS

| | | | |
|---|---|---|---|
| 11,278,366 B2* | 3/2022 | Kose | A61B 34/74 |
| 11,599,101 B2* | 3/2023 | Huang | G05B 19/416 |
| 2018/0248498 A1* | 8/2018 | Piitulainen | H02P 25/064 |

* cited by examiner

METHOD FOR CONTROLLING DIRECT DRIVE TRANSMISSION SYSTEM AND RELATED DEVICE

TECHNICAL FIELD

The present disclosure relates to the technical field of transmission system control, and in particular, to a method for controlling a direct drive transmission system and related devices.

BACKGROUND

With the development of direct drive transmission system technologies, a method for controlling a direct drive transmission system has been widely used in various kinds of direct drive motors.

The direct drive transmission system in the related art includes multiple stators and multiple movers. The stator drives the mover to move linearly. In exiting direct drive transmission systems, most of the direct drive transmission systems adopt an absolute position feedback scheme to realize feedback of the motion position. An absolute grating scale or magnetic scale, a linear hall sensor, and a sensing scale are mostly used as feedback units.

However, in the related art, the absolute grating scale and magnetic scale have high positioning accuracy but with high cost, and the linear hall sensor and the sensing scale have low costs but low accuracy of position detection. Under this circumstances, it is difficult to balance costs and positioning accuracy of the feedback unit, leading to a poor position feedback effect and low positioning accuracy.

Therefore, there is a need to provide a new method for controlling a direct drive transmission system and related devices to solve the above problems.

SUMMARY

The technical problem to be solved in the present disclosure is to provide a method for controlling a direct drive transmission system and related devices that have good position feedback effect and high positioning accuracy and effectively reduce costs.

In order to solve the above technical problems, in a first aspect, the present disclosure provides a method for controlling a direct drive transmission system. The direct drive transmission system includes a plurality of stators successively connected into a stator unit, a guide rail mounted to the stator unit, a plurality of movers forming a slidable connection with the guide rail and being movable relative to the plurality of stators, a plurality of first incremental position feedback means, a plurality of second incremental position feedback means, a plurality of actuators, and a controller. Each of the first incremental position feedback means is mounted on one of the movers, and each of the second incremental position feedback means is mounted on each of the stators. A first zero mark and a second zero mark spaced from each other are preset on each of the first incremental position feedback means, a distance between the first zero mark and the second zero mark is a preset value, and the plurality of actuators are connected to the plurality of second incremental position feedback means respectively and are connected to the controller. The method includes the following steps: S1: starting the direct drive transmission system for overall zero returning so that all the movers move in a same direction; S2: reading, by each of the actuators, a zero signal of the first incremental position feedback means identified by a corresponding second incremental position feedback means; S3: determining whether any one of the actuators reads two zero signals; if yes, performing step S4; otherwise, returning to step S1; S4: determining according to a distance between the two zero signals fed back by the actuator that a corresponding mover of the movers has completed zero returning, and further completing zero returning of the direct drive transmission system; and S5: acquiring, by the controller based on the direct drive transmission system after zero returning, position information of each of the movers, and driving the movers to move.

As an improvement, step S4 specifically includes the following steps: S41: when the distance between the two zero signals is the preset value, determining that the corresponding mover has completed zero returning, and determining position information of one of the stators following the stator corresponding to the mover completing zero returning as accurate position information of the mover completing zero returning; and S42: establishing a coordinate system of the direct drive transmission system according to the accurate position information, so as to realize zero returning of the direct drive transmission system.

As an improvement, the first incremental position feedback means are mounted directly opposite the second incremental position feedback means.

As an improvement, the first incremental position feedback means are incremental scales.

As an improvement, the second incremental position feedback means are reading heads, and the reading heads are arranged directly opposite to the incremental scales.

As an improvement, the incremental scales are grating scales or magnetoscales.

As an improvement, the plurality of stators are arranged adjacent to each other.

As an improvement, a first pulley and a second pulley are arranged opposite to each other under the mover, and the first pulley and the second pulley abut against two sides of the guide rail to form the slidable connection.

In a second aspect, an embodiment of the present disclosure further provides a computer device, including: a memory, a processor, and a computer program stored on the memory and executable by the processor, when executing the computer program, the processor is configured to implement the method for controlling a direct drive transmission system in the above embodiments.

In a third aspect, an embodiment of the present disclosure further provides a non-transitory storage medium storing a computer program, when executed by a processor, the computer program causes the processor to implementing steps in the method for controlling a direct drive transmission system in the above embodiments.

Compared with the related art, in the method for controlling a direct drive transmission system and the related devices according to the present disclosure, a first incremental position feedback means is mounted on each mover, and a second incremental position feedback means is mounted on each stator. A first zero mark and a second zero mark spaced from each other are preset on each first incremental position feedback means, a distance between the first zero mark and the second zero mark is a preset value, a plurality of actuators are connected to the plurality of second incremental position feedback means respectively and are connected to a controller. The direct drive transmission system is started for overall zero returning so that all the movers move in a same direction. Each of the actuators reads a zero signal of the first incremental position feedback means identified by the corresponding second incremental position feedback means. When any one of the actuators reads two zero signals, it is determined according to a distance between the two zero signals fed back by the actuator that the corresponding mover has completed zero returning, and zero returning of the direct drive transmission system is further completed. The controller acquires, based on the direct drive transmission system after zero returning, position information of each of the movers and drives the movers to move. Based on the identified zero, the second incremental position feedback means mounted on each stator may feed back position information of the corresponding mover in real time, and transmit position information during the operation to the direct drive transmission system for drive control over the mover, so that the mover has good position feedback effect, high positioning accuracy, and reduced costs.

BRIEF DESCRIPTION OF DRAWINGS

In order to better illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art from the provided drawings without creative efforts.

DESCRIPTION OF EMBODIMENTS

Figure 1:
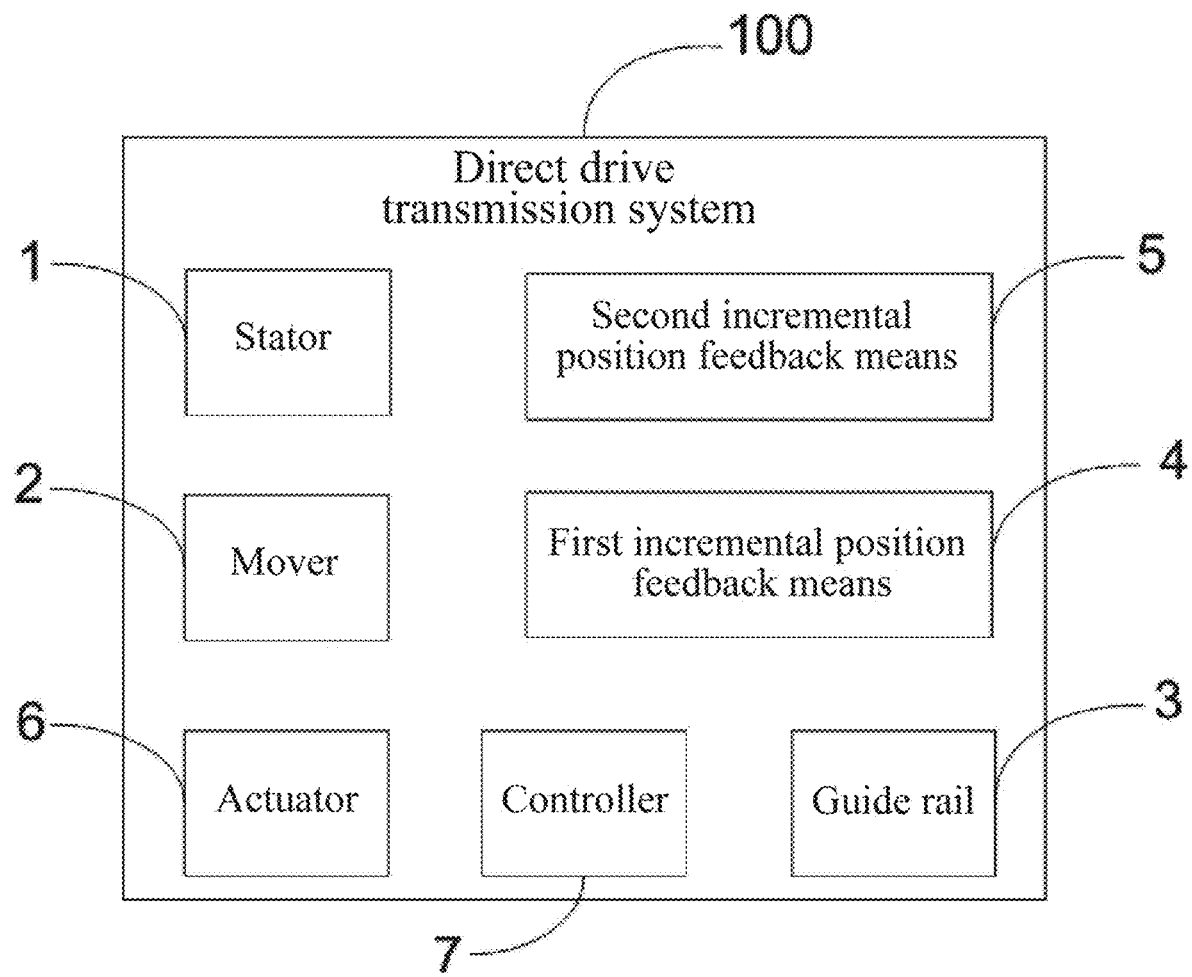
FIG. 1 is a module diagram of a direct drive transmission system according to the present disclosure.
Figure 2:
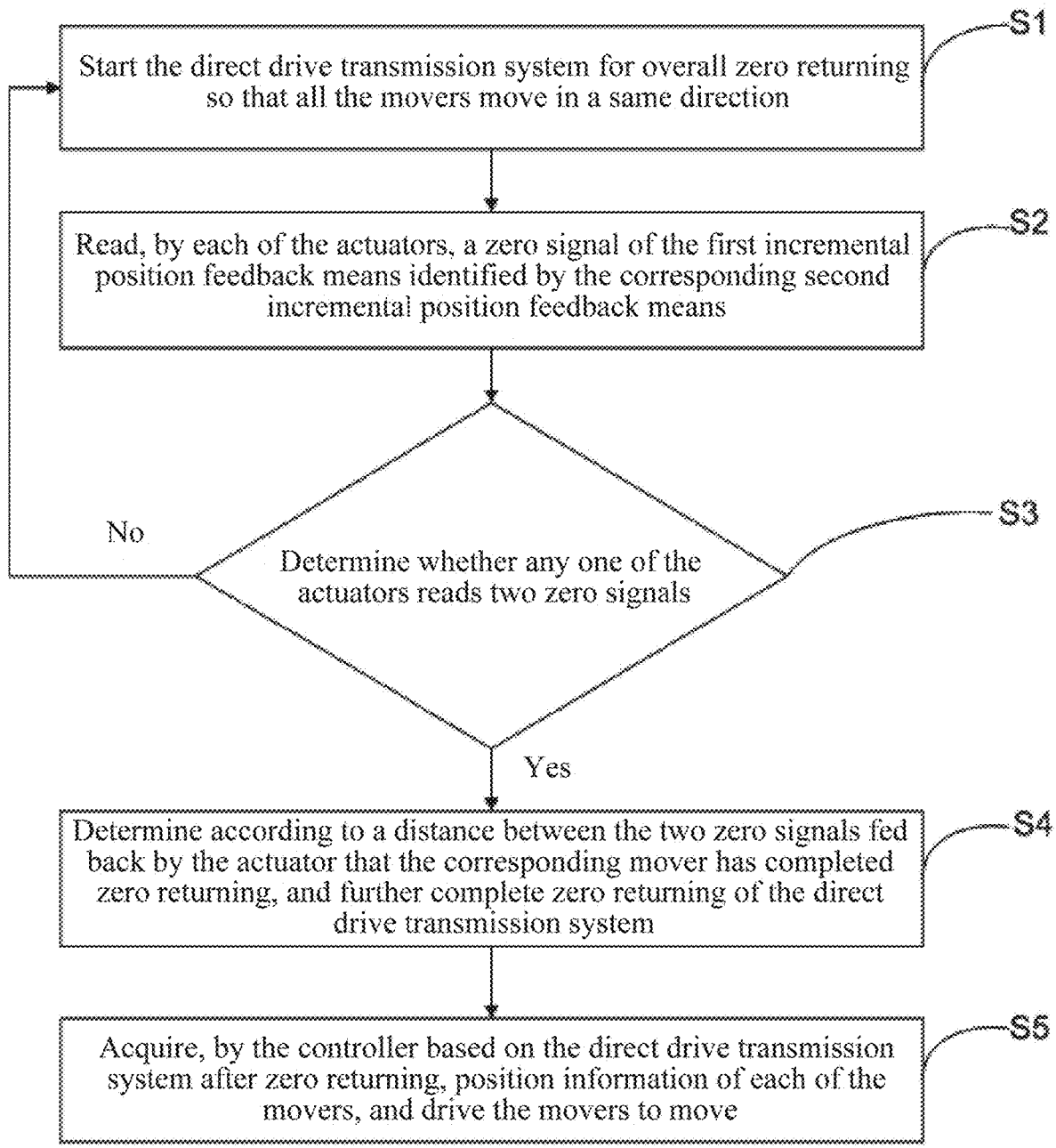
FIG. 2 is a flowchart of a method for controlling a direct drive transmission system according to the present disclosure.
Figure 3:
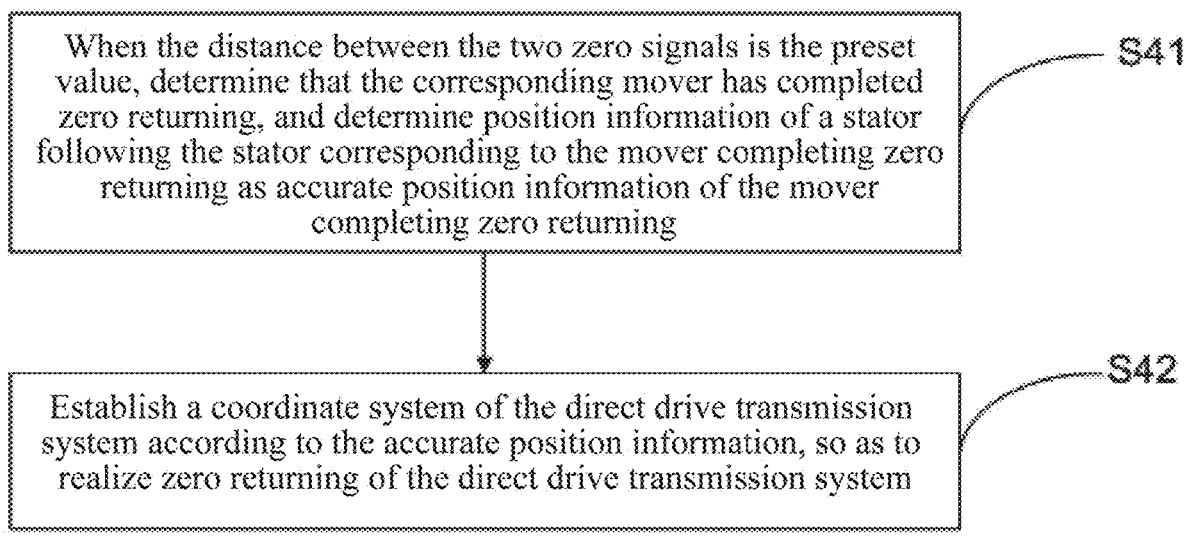
FIG. 3 is a flowchart of step S4 in FIG. 2.
Figure 4:
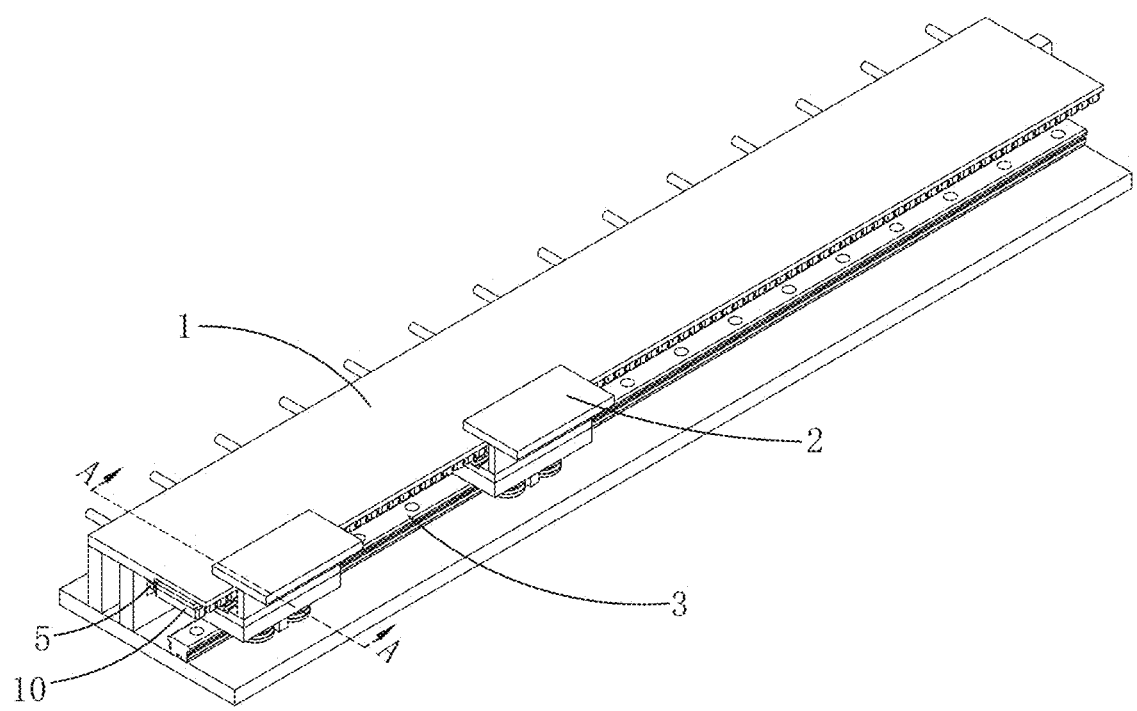
FIG. 4 is a schematic structural diagram of a direct drive transmission system according to the present disclosure.
Figure 5:
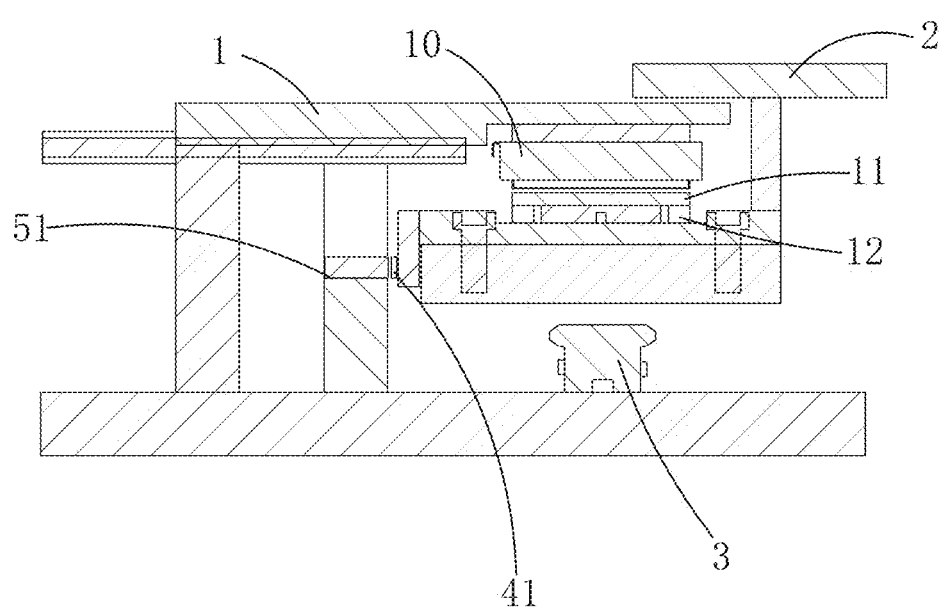
FIG. 5 is a sectional view taken along line A-A in FIG. 4.
Figure 6:
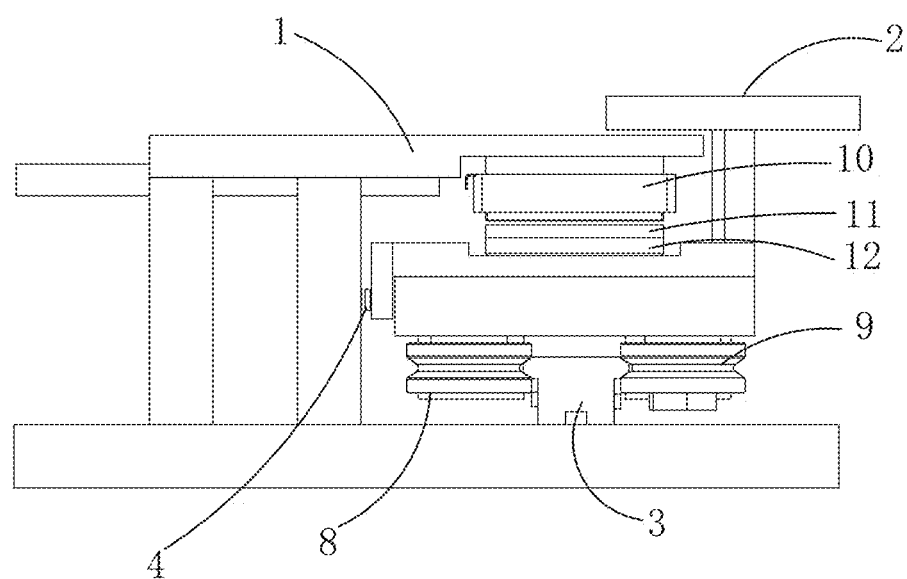
FIG. 6 is a left view of FIG. 4.
Figure 7:
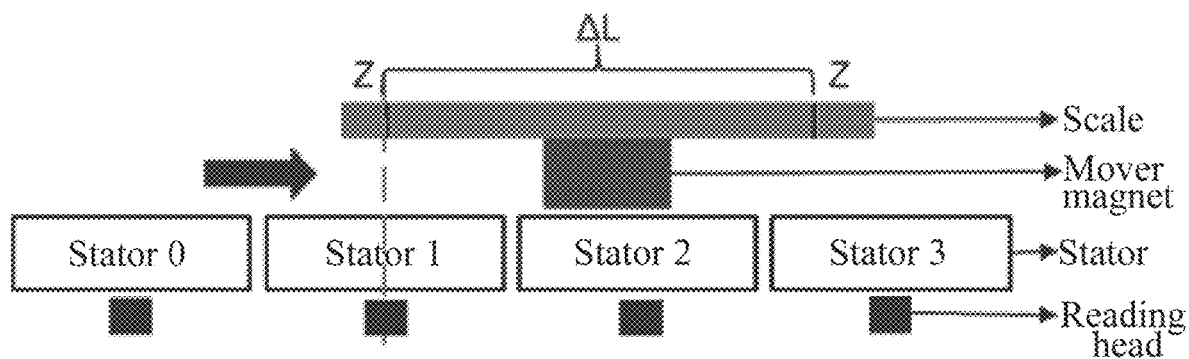
FIG. 7 is a schematic diagram of determining a preset value in the method for controlling a direct drive transmission system according to the present disclosure.

The technical solutions in the embodiments of the present disclosure will be described below with reference to the accompanying drawings in the embodiments of the present disclosure. It is appreciated that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Referring to FIG. 1 to FIG. 7, a method for controlling a direct drive transmission system is provided. The direct drive transmission system 100 includes a plurality of stators 1 successively connected into an entire stator unit (not shown), a guide rail 3 mounted to the stator unit, a plurality of movers 2 forming a slidable connection with the guide rail 3 and movable relative to the plurality of stators 1, a plurality of first incremental position feedback means 4, a plurality of second incremental position feedback means 5, a plurality of actuators 6, and a controller 7. Each of the first incremental position feedback means 4 is mounted on one of the movers 2, and each of the second incremental position feedback means 5 is mounted on one of the stators 1. A first zero mark and a second zero mark spaced from each other are preset on each of the first incremental position feedback means 4, a distance between the first zero mark and the second zero mark is a preset value, and the plurality of actuators 6 are connected to the plurality of second incremental position feedback means 5 respectively and are connected to the controller 7.

Two or more stators 1 are provided, which may be specifically selected and set according to an actual requirement.

By carving the first zero mark and the second zero mark on two ends of the first incremental position feedback means 4, requirements on zero identification of forward and reverse motion of the motor 2 can be met. When the first zero mark and the second zero mark on the first incremental position feedback means 4 moves through the second incremental position feedback means 5, the second incremental position feedback means 5 may output a zero level signal. The zero level signal is a Z-point signal output.

The first zero mark and the second zero mark may be scale lines, scale points, or the like. Optionally, the first zero mark and the second zero mark may also be marking lines of other shapes, which may be selected according to an actual situation.

The preset value is set to $\Delta L$, zero signals of the first zero mark and the second zero mark are Z respectively, and $\Delta L$ denotes a feedback distance between two Z.

The method includes the following steps.

In S1, the direct drive transmission system 100 is started for overall zero returning so that all the movers 2 move in a same direction.

Through the overall zero returning, it is convenient to complete dynamic selection of a zero position.

The actuator 6 controls all the movers 2 to move forward or reversely, and the second incremental position feedback means 5 reads information of the first incremental position feedback means 4 in real time and feeds back the information to the actuator 6.

In S2, each of the actuators 6 reads a zero signal of the first incremental position feedback means 4 identified by the corresponding second incremental position feedback means 5.

Position information of the mover 2 can be acquired in real time, which facilitates positioning of motion. The second incremental position feedback means 5 reads the information of the first incremental position feedback means 4 in real time and forms feedback information, and a zero signal fed back by the second incremental position feedback means 5 is read through the actuator 6.

In S3, it is determined whether any one of the actuators 6 reads two zero signals; if yes, step S4 is performed; otherwise, step S1 is performed.

In S4, it is determined according to a distance between the two zero signals fed back by the actuator 6 that the corresponding mover 2 has completed zero returning, and zero returning of the direct drive transmission system is further completed.

In S5, the controller 7 acquires, based on the direct drive transmission system after zero returning, position information of each of the movers, and drives the movers to move.

Based on the identified zero, the second incremental position feedback means 5 mounted on each stator 1 may feed back position information of the corresponding mover 2 in real time, and transmit position information during the operation to the direct drive transmission system for drive control over the mover 2, so that the mover 2 has good position feedback effect, high positioning accuracy, and reduced costs.

A first incremental position feedback means 4 is mounted on each mover 2, and a second incremental position feedback means 5 is mounted on each stator 1. A first zero mark and a second zero mark spaced from each other are preset on each first incremental position feedback means 4, a distance between the first zero mark and the second zero mark is a preset value, a plurality of actuators 6 are connected to the plurality of second incremental position feedback means 5 respectively and are connected to a controller 7. The direct drive transmission system 100 is started for overall zero returning so that all the movers 2 move in a same direction. Each of the actuators 6 reads a zero signal of the first incremental position feedback means 4 identified by the corresponding second incremental position feedback means 5. When any one of the actuators 6 reads two zero signals, it is determined according to a distance between the two zero signals fed back by the actuator 6 that the corresponding mover 2 has completed zero returning, and zero returning of the direct drive transmission system 100 is further completed. The controller 7 acquires, based on the direct drive transmission system 100 after zero returning, position information of each of the movers and drives the movers to move. The second incremental position feedback means 5 reads the information of the first incremental position feedback means 4 in real time. When the second incremental position feedback means 5 identifies two zero signals of the first incremental position feedback means 4 and a feedback distance between the two zero signals is a set value, based on the identified zero, the second incremental position feedback means 5 mounted on each stator 1 may feed back position information of the corresponding mover 2 in real time, and transmit position information during the operation to the direct drive transmission system for drive control over the mover 2, so that the mover 2 has good position feedback effect, high positioning accuracy, and reduced costs.

In an embodiment, step S4 specifically includes the following steps.

In S41, when the distance between the two zero signals is the preset value, it is determined that the corresponding mover has completed zero returning, and position information fed back by the second incremental position feedback means 5 mounted on a stator following the stator corresponding to the mover completing zero returning is determined as accurate position information of the mover completing zero returning.

The two zero signals are zero signals of the two zero marks read through the position passed by the second incremental position feedback means 5 corresponding to the first incremental position feedback means 4. When the feedback distance between the two zero signals is the preset value, it is determined that the mover 2 has completed zero returning, and the mover 2 has good zero returning effect. At the same time, a feedback position of the second incremental position feedback means 5 of the following stator 1 can also be determined as an accurate position of the mover 2.

The preset value may be 1 mm, 10 mm, 100 mm, or the like, which may be selected according to an actual situation.

In S42, a coordinate system of the direct drive transmission system is established according to the accurate position information, so as to realize zero returning of the direct drive transmission system.

A global position coordinate system is established according to position feedback information of the mover 2. Position coordinates of the first incremental position feedback means 4 and the second incremental position feedback means 5 are formed through the global position coordinate system, which facilitates the actuator 6 to quickly and accurately read the zero signal fed back by the second incremental position feedback means 5 to control the controller 7 to drive and control the mover, so as to complete zero returning of the direct drive transmission system.

In an embodiment, the first incremental position feedback means 4 are mounted directly opposite the second incremental position feedback means 5. It is convenient for the second incremental position feedback means 5 to read the position information of the first incremental position feedback means 4 in real time.

In an embodiment, the first incremental position feedback means 4 are incremental scales 41. A measurement principle of the incremental scale involves modulating light into Moire fringes through two gratings moving relative to each other, thereby obtaining a displacement variation by counting and subdividing the Moire fringes, and setting one or more reference points on a scale grating to determine positions. Optionally, the incremental scale 41 is mounted on the mover 2, and the incremental scale 41 has high feedback position accuracy.

In an embodiment, the second incremental position feedback means 5 are reading heads 51, and the reading heads 51 are arranged directly opposite the incremental scales 41, so that the reading heads 51 can identify information of the incremental scales 41 in real time, thereby bringing good read and write identification efficiency.

Optionally, the reading heads 51 are mounted on the stator 1, so that the reading heads 51 can acquire information of the first incremental position feedback means 4 in real time when the first incremental position feedback means 4 of the mover 2 pass through the reading heads 51, and high position accuracy is achieved.

In an embodiment, the incremental scales 41 are grating scales or magnetoscales. The grating scales or magnetoscales have low costs. The incremental scales 41 are not limited to the grating scales or magnetoscales In an embodiment, the plurality of stators 1 are arranged adjacent to each other. The plurality of stators 1 are closely arranged so that the stators 1 have a good driving control effect on the mover 2.

In an embodiment, a first pulley 8 and a second pulley 9 are arranged oppositely under the mover 2, and the first pulley 8 and the second pulley 9 are respectively arranged in contact on two sides of the guide rail 3. It is convenient for the mover 2 to slide on the guide rail 3.

The mover 2 is provided with a magnet 11 and a conducting magnet 12, the stator 1 is provided with a plurality of winding coils 10 adjacent to each other, the winding coils 10 and the reading heads 51 are mounted on the stator 1, the winding coils 10 and the reading heads 51 are connected to the actuators 6 respectively through cables. When the scales pass through the reading heads 51, the drier 6 can quickly and accurately read zero signals fed back by the reading heads 51 with a fast zero marking method. One actuator 6 is connected to one winding coil 10 and one reading head 51, respectively. One controller 7 is connected to the plurality of actuators 6. A plurality of different controllers 6 are controlled by a same controller 7 to realize systematic direct drive motion.

The magnet 11 is first mounted on the conducting magnet 12. The conducting magnet 12 is mounted on the mover 2 to realize that the conducting magnet 12 and the magnet 11 are fixed together in the mover 2 to facilitate the winding coil 10 to drive the magnet 11 to move, and the mover 2 and the stator 1 are guided by the guide rail 3.

The winding coil 10 is energized and generates an electromagnetic field with the magnet 11, thereby driving the magnet 11 to move and drives the mover 2 to move on the guide rail 3.

Figure 8:
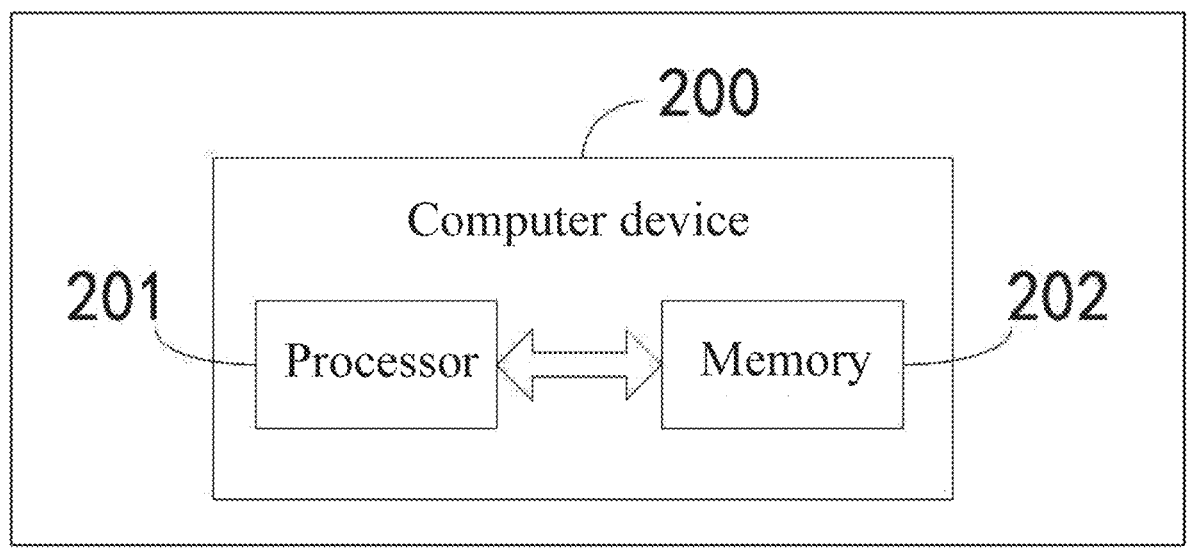
FIG. 8 is a module diagram of a computer device according to the present disclosure.

An embodiment of the present disclosure further provides a computer device 200. Referring to FIG. 8, the computer device 200 includes: a memory 202, a processor 201, and a computer program stored on the memory and runnable on the processor. The processor 201, when executing the computer program, implements steps in the method for controlling a direct drive transmission system in the above embodiments.

The computer device 200 is equivalent to the controller 7 in the direct drive transmission system 100 in embodiments of the present disclosure.

The processor 201 calls the computer program stored in the memory 202 to implement steps in the method for controlling a direct drive transmission system in the above embodiments when executing the computer program.

An embodiment of the present disclosure further provides a non-transitory storage medium. The non-transitory storage medium stores a computer program. The computer program, when executed by a processor, causes the processor to implementing steps in the method for controlling a direct drive transmission system in the above embodiments, and can achieve the same technical effect. Details are not described herein so as to avoid repetition.

Those of ordinary skill in the art may understand that some or all procedures in the methods in the foregoing embodiments may be implemented by a computer program instructing related hardware, the program may be stored in a non-transitory storage medium, and when the program is executed, the procedures in the foregoing method embodiments may be implemented. The storage medium may be a magnetic disk, an optical disk, a Read-Only Memory (ROM), a Random Access Memory (RAM), or the like.

It is to be noted that the terms such as "comprise", "include" or other variations thereof are intended to cover a non-exclusive inclusion, for example, processes, methods, items or apparatuses including a series of elements are not limited to these elements listed explicitly, but rather include other elements not listed explicitly, or other elements inherent to these processes, methods, items or apparatuses. In the absence of further limitations, elements defined by the statement "include a/an . . . " do not preclude the existence of additional identical elements in the processes, methods, items or apparatuses including the elements.

Through the descriptions of the above embodiments, it is clear to those skilled in the art that the present disclosure may be implemented by software and a necessary universal hardware platform or by hardware, but in many cases the former is preferred. Based on such understanding, the technical solutions in the present disclosure essentially, or the part contributing to the related art may be implemented in a form of a software product. The computer software product is stored in a storage medium (e.g., an ROM/RAM, a magnetic disk, or an optical disk), and includes several instructions for instructing a terminal (which may be a mobile phone, a computer, a server, an air conditioner, a network device, or the like) to perform the methods described in the embodiments of the present disclosure.

The above are only embodiments of the present disclosure. It should be pointed out herein that those of ordinary skill in the art may further make improvements without departing from the inventive concept of the present disclosure. The improvements all fall within the protection scope of the present disclosure.

What is claimed is:

1. A method for controlling a direct drive transmission system, wherein the direct drive transmission system comprises a plurality of stators successively connected into a stator unit, a guide rail mounted to the stator unit, a plurality of movers forming a slidable connection with the guide rail and being movable relative to the plurality of stators, a plurality of first incremental position feedback means, a plurality of second incremental position feedback means, a plurality of actuators, and a controller, wherein each of the first incremental position feedback means is mounted on one of the movers, and each of the second incremental position feedback means is mounted on each of the stators; a first zero mark and a second zero mark spaced from each other are preset on each of the first incremental position feedback means, a distance between the first zero mark and the second zero mark is a preset value, and the plurality of actuators are connected to the plurality of second incremental position feedback means respectively and are connected to the controller, wherein the method comprises:
S1: starting the direct drive transmission system for overall zero returning so that all the movers move in a same direction;
S2: reading, by each of the actuators, a zero signal of the first incremental position feedback means identified by a corresponding second incremental position feedback means;
S3: determining whether any one of the actuators reads two zero signals; if yes, performing step S4; otherwise, returning to step S1;
S4: determining according to a distance between the two zero signals fed back by the actuator that a corresponding mover of the movers has completed zero returning, and further completing zero returning of the direct drive transmission system; and
S5: acquiring, by the controller based on the direct drive transmission system after zero returning, position information of each of the movers, and driving the movers to move.

2. The method for controlling a direct drive transmission system as described in claim 1, wherein step S4 comprises:
S41: when the distance between the two zero signals is the preset value, determining that the corresponding mover has completed zero returning, and determining position information of one of the stators following the stator corresponding to the mover completing zero returning as accurate position information of the mover completing zero returning; and
S42: establishing a coordinate system of the direct drive transmission system according to the accurate position information, so as to realize zero returning of the direct drive transmission system.

3. The method for controlling a direct drive transmission system as described in claim 1, wherein the first incremental position feedback means are mounted directly opposite to the second incremental position feedback means.

4. The method for controlling a direct drive transmission system as described in claim 1, wherein the first incremental position feedback means are incremental scales.

5. The method for controlling a direct drive transmission system as described in claim 4, wherein the second incremental position feedback means are reading heads, and the reading heads are arranged directly opposite to the incremental scales.

6. The method for controlling a direct drive transmission system as described in claim 4, wherein the incremental scales are grating scales or magnetoscales.

7. The method for controlling a direct drive transmission system as described in claim 1, wherein a first pulley and a second pulley are arranged opposite to each other under the mover, and the first pulley and the second pulley abut against two sides of the guide rail to form the slidable connection.

* * * * *